(12) United States Patent
McNerney

(10) Patent No.: US 7,351,033 B2
(45) Date of Patent: Apr. 1, 2008

(54) WIND TURBINE LOAD CONTROL METHOD

(76) Inventor: Gerald McNerney, 6769 Menlo Ct., Pleasanton, CA (US) 94588

( * ) Notice: Subject to any disclaimer, the term of this patent is extended or adjusted under 35 U.S.C. 154(b) by 187 days.

(21) Appl. No.: 11/223,795

(22) Filed: Sep. 9, 2005

(65) Prior Publication Data

US 2007/0057517 A1    Mar. 15, 2007

(51) Int. Cl.
*F03D 7/04* (2006.01)
(52) U.S. Cl. .............. 416/1; 416/35; 416/40; 416/43; 416/44; 416/61; 416/155
(58) Field of Classification Search ............ 416/35, 416/40, 43, 44, 46, 61, 147, 155, 1
See application file for complete search history.

(56) References Cited

U.S. PATENT DOCUMENTS 4,426,192 A * 1/1984 Chertok et al. ............... 416/1
6,619,918 B1 * 9/2003 Rebsdorf ....................... 416/1

* cited by examiner

*Primary Examiner*—Ninh H. Nguyen
(74) *Attorney, Agent, or Firm*—John Vanden Bosche

(57) ABSTRACT

A method for limiting loads in a wind turbine by using measured loads or wind speed to increase the minimum pitch angle for extended periods. The minimum pitch angle will be allowed to relax down to the default when load excursions diminish. The method will allow turbines to capture more energy by operating in higher wind speeds and/or utilizing larger rotors without additional loss of fatigue life.

26 Claims, 7 Drawing Sheets

WIND TURBINE LOAD CONTROL METHOD

1. FIELD OF THE INVENTION

The present invention is a method by which the control system can be used to limit the operating loads of a wind turbine thereby allowing more energy to be captured.

2. BACKGROUND OF THE INVENTION

A wind turbine is an electric power generating device that captures the energy in the wind by using rotating airfoil blades to develop aerodynamic lift, thereby removing momentum from the air flow and converting it into useful mechanical work. Wind turbines can operate as either horizontal or vertical axis devices, although horizontal axis wind turbines are far more common.

The aerodynamic blades are attached to a hub, which is in turn connected to a main shaft. The main shaft is supported by a main shaft bearing housing assembly which rests on a structural frame. The speed of the main shaft is normally too slow for most generating devices, and so must be increased by transmission, although some modern wind turbines use direct drive generators, avoiding the need for transmissions. The output of the transmission is a high speed or drive shaft that turns the generator to produce electric power. The generator is also supported by the structural frame, which attaches to a yaw bearing, which in turn bolts to a tower. The tower rests on a foundation.

The main shaft bearing housing assembly, the transmission, and the structural frame, or sub groupings thereof are combined in some wind turbine embodiments.

Wind turbines are given a power curve by the manufacturer, and this power curve defines the power production of the wind turbine as a function of wind speed. The power curve includes the rated power, which is the maximum operating power of the turbine, and the wind speed at which the rated power is achieved, called the rated wind speed.

The prior art of pitch to feather for power regulation consists of using a control system to dynamically pivot the blades on a set of blade pitch bearings to change the aerodynamic lift and drag of the blade and consequent mechanical torque that gets transmitted to the generator. The control action is normally achieved by the use of a power transducer and a microprocessor that activates a blade pitch actuator or actuators. The pitch control system can use an electromechanical system, a hydraulic system, or any active method to apply the torque necessary to pivot the blades on the pitch bearings. Other types of power measurements and logic controllers are also in use. Common terminology considers the blades to pitch to lower angles for more power and higher loads, and to pitch to higher angles or feather to reduce power and associated loads. The lowest or most energetic pitch angle is normally zero degrees and the highest pitch angle is 90 degrees used in parking the rotor. Operating with a zero degree pitch angle will yield the highest power and the highest loads, while a 90 degree pitch angle will normally result in the lowest structural loads. In active pitch control systems, the generated power can exceed the rated power in short term excursions, but the turbine and the generator are designed to operate at the rated power, and the average power taken over periods longer than about one minute should not exceed the rated power.

In pitch to feather regulation the aerodynamic angle of attack is adjusted to higher angles of attack (toward feather) thereby spilling excess power and excess loads. Pitch to feather control allows the machine to be stopped and started by pure aerodynamic forces, and a physical brake is needed only for emergencies and to lock the rotor for maintenance activities. There are several types of pitch to feather control algorithms in use. The most common type is the Proportional, Integral, Derivative (PID) control method as taught in U.S. Pat. No. 6,856,039 issued to Mikhail et al. in February 2005, incorporated herein by reference. PID algorithms use the power measurement at each time step of the controller to calculate the error between the measured power and the rated power (the proportional difference). The proportional difference together with the integral and derivative differences are used to decide which direction and how much to change the blade pitch angle. A second method calculates an observer wind speed as taught in U.S. Pat. No. 5,155,375 issued to Holley in October 1992, incorporated herein by reference. A third method is a deadband controller as taught in U.S. Pat. No. 4,426,192 issued to Chertok et al. in January 1984, incorporated herein by reference, which monitors the power and commands a pitch drive when the power is outside the deadband: pitch to feather when the power exceeds the upper deadband, and pitch to power when the power falls below the lower deadband.

A significant cause of load excursions in wind turbines is the action of the controller to reduce the blade pitch angle when the power drops. This action will tend to increase the power back to the rated power value. In random winds, negative wind gusts are often followed by positive gusts, in which case if the pitch angle has been reduced, the positive gust combined with the reduction in pitch angle will result in a rapid rise in power. Consequently, pitch to feather wind turbines experience a wide range of loads. The problem is exacerbated in high winds because as the average wind speed increases, the average pitch angle will increase, and at high pitch angles the aerodynamic forces are much more sensitive to changes in the pitch angle and wind speed, so the load excursions are larger. Variable speed wind turbines perform better than constant speed wind turbines in controlling power generation levels in fluctuating wind by allowing the rotor to speed up and slow down with fluctuations in wind while holding generator torque constant. However, blade loads are not controlled by variable speed wind turbines. Indeed, as the rotor speed increases during a wind gust, the out of plane blade loads, or thrust loads on the rotor, actually increase more than they would if the rotor speed were held constant.

Power regulation limits the average power of a wind turbine to rated power but short term excursions of power can be very large, occasionally going more than twice the rated power. Generators absorb these power excursions at the cost of generator life. Moreover, the aerodynamic forces are not limited to generating productive mechanical torque. The forces on the airfoil that are in the plane of the rotor's rotation are predominantly productive, but the out of plane forces on the airfoil result in predominantly non-productive or parasitic loads and have higher amplitudes than the productive loads. The out of plane forces are perpendicular to the plane of rotation and result in thrust forces on the main shaft and on bending moments at the blade roots and the blade/hub connection. The main shaft will also experience bending moments due to gyroscopic forces when the rotor changes direction, and due to differences in thrust forces between different blades. Pitch control systems generally control the power generating loads, but the larger parasitic loads are only regulated indirectly and also experience large excursions. This makes it necessary to design the turbines heavier to withstand excess loading and forces wind turbine to shut down at wind speeds that are lower than is typically desired. One approach to limit damage from excessive loads due to mechanical vibrations is taught by U.S. Pat. No. 6,525,519 issued to Garnaes in February 2003, incorporated herein by reference. This approach uses spectral analysis to detect excess vibration, in which case the blades are driven to feather until the vibration stops and active control is resumed. Although this will reduce vibration induced loads and associated damage, normal operating parasitic loads in stall can be very large and will not be detected or attenuated.

Another approach to limiting loads is taught in U.S. Pat. No. 6,361,275 issued to Wobben in March 2002, incorporated herein by reference. This method measures loads with strain gages, blade position, and wind speed at the blades and uses the measurement to make instantaneous adjustments to individual blades, a plurality of blades, or all the blades to limit loads. The problem with the Wobben method is that strain gages are notoriously failure prone, getting information from the blades to the controller is failure prone and expensive, and using all this information reliably in real-time is a significant engineering challenge. Moreover, relying on instantaneous blade pitch angle adjustments based on loads will result in the same problem discussed above in which negative and positive gusts combine with pitch changes to produce large load excursions.

Weitkamp teaches in U.S. Patent Application 2002/0000723 A1 published in January of 2002, incorporated herein by reference, a method which uses load measurements to develop an actual load distribution for comparison with a predetermined load distribution and the Cost of Energy to optimize the performance by adjusting the power curve. Simply adjusting the power curve will not limit load excursions. Moreover, the method for optimizing the performance is complex and assumes that the measured load distribution reflects fatigue damage, and that the results can be used to operate close to the margins. These assumptions lower the probability of successful application of the method in limiting fatigue damage without significantly impacting the cost of energy.

Still another approach to limiting loads is taught in U.S. Pat. No. 6,619,918 issued to Rebsdorf in September 2003, incorporated herein by reference, in which blade measurements are used to limit loads, but no method for limiting the loads is given and as above, using instantaneous control may result in large load excursions. Moreover, getting blade measurements to the controller is expensive and failure prone.

3. SUMMARY OF THE INVENTION

The operating loads of a wind turbine with a pitch control system having sufficient capability can be significantly reduced by the use of a simple control algorithm and load sensor. The method works by increasing the minimum pitch angle parameter of the controller for extended periods of time while allowing the controller to vary the pitch angle normally as the turbine loads increase in high or gusty wind conditions, or in conditions of high wind shear. In other words, based on load measurements, the load limiting algorithm adjusts a minimum pitch angle parameter to prevent the dynamic control algorithm from lowering the pitch angle to values that will cause high loads. This requires the controller to have measurements or dynamic estimates of wind speeds or loads, and sufficient flexibility to use the measured data to adjust the minimum pitch angle parameter. The controller will allow the minimum pitch angle parameter to relax back toward the absolute minimum pitch angle when the loads diminish for a sufficiently long period of time. If this approach causes the average power of the turbine to decrease below rated power in wind speeds above the wind speed of rated power, the rated power set point can be adjusted upward to compensate.

This invention will decrease loads and allow the turbine to operate in higher winds and/or with a larger rotor in most wind sites. These changes will result in significantly higher energy capture while only incurring marginally higher costs of an additional sensor and longer blades. Consequently, the cost of energy, the ultimate economic measure of a wind turbine, will be lower, making wind energy an attractive source of fuel displacement and power capacity.

4. BRIEF DESCRIPTION OF THE DRAWINGS

5. DETAILED DESCRIPTION OF THE INVENTION

The present invention can be used in any active pitch to feather controller to limit loads by using wind speed and/or load measurement to increase the minimum pitch angle parameter for extended periods. The invention can be augmented by using the rated power as an adjustable parameter to keep the average power from dropping as a result of load limiting.

Figure 1:
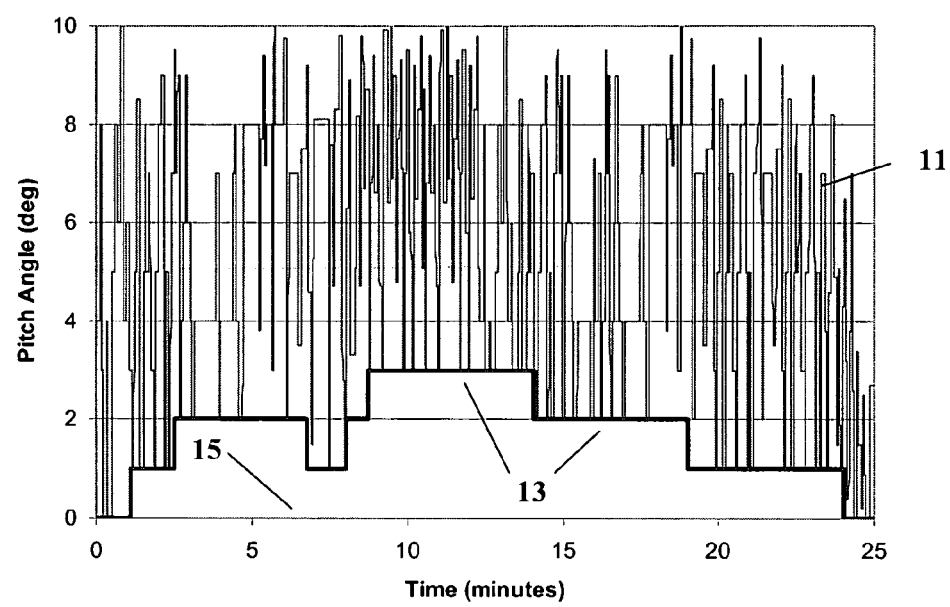
FIG. 1 illustrates how the algorithm affects the pitch angle in wind turbine control operation.
Figure 2:
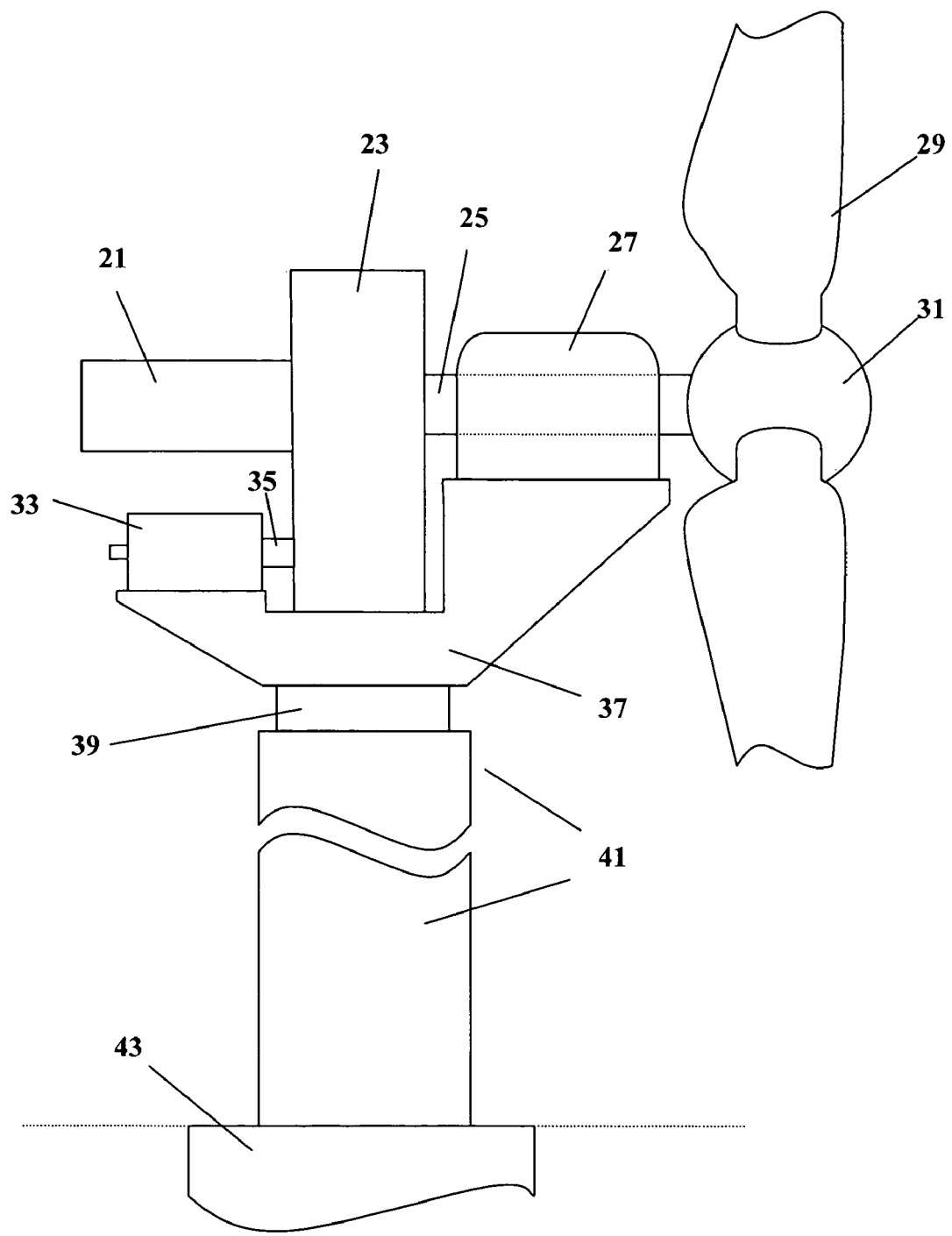
FIG. 2 illustrates the major subsystems of a wind turbine.

The method adjusts the minimum pitch angle parameter which provides a lower limit to the pitch angle in active control. FIG. 1 illustrates how the method is applied in practice. In this figure the wind speed is above the rated wind speed, and the controller is actively regulating power. The pitch angle 11 is limited below by the minimum pitch angle parameter 13. The minimum pitch angle parameter 13 will increase when the measured loads (not shown) exceed desired values and will drop down when the loads have diminished for a long enough period of time but must always be greater than or equal to the absolute minimum pitch angle 15, the lowest pitch angle that will ever be used.

The preferred embodiment of this invention limits loads and avoids fatigue damage to components of operating wind turbines by comparing any type of load measurement against a load threshold parameter of corresponding type to adjust the minimum pitch angle parameter 13 for extended periods of time. A second embodiment of this invention uses a measurement or estimate of the average wind speed to increase the minimum pitch angle parameter 13 as a function of the average wind speed to reduce loads in high winds. A third embodiment of the invention adjusts the minimum pitch angle parameter 13 by using a PID method comparing measured loads to corresponding threshold values.

Loads can be measured directly by means of strain gages or indirectly by means of acceleration, power, wind speed, or other means. Direct load measurements can be made on any of the structural components of the wind turbine. FIG.

Figure 3:
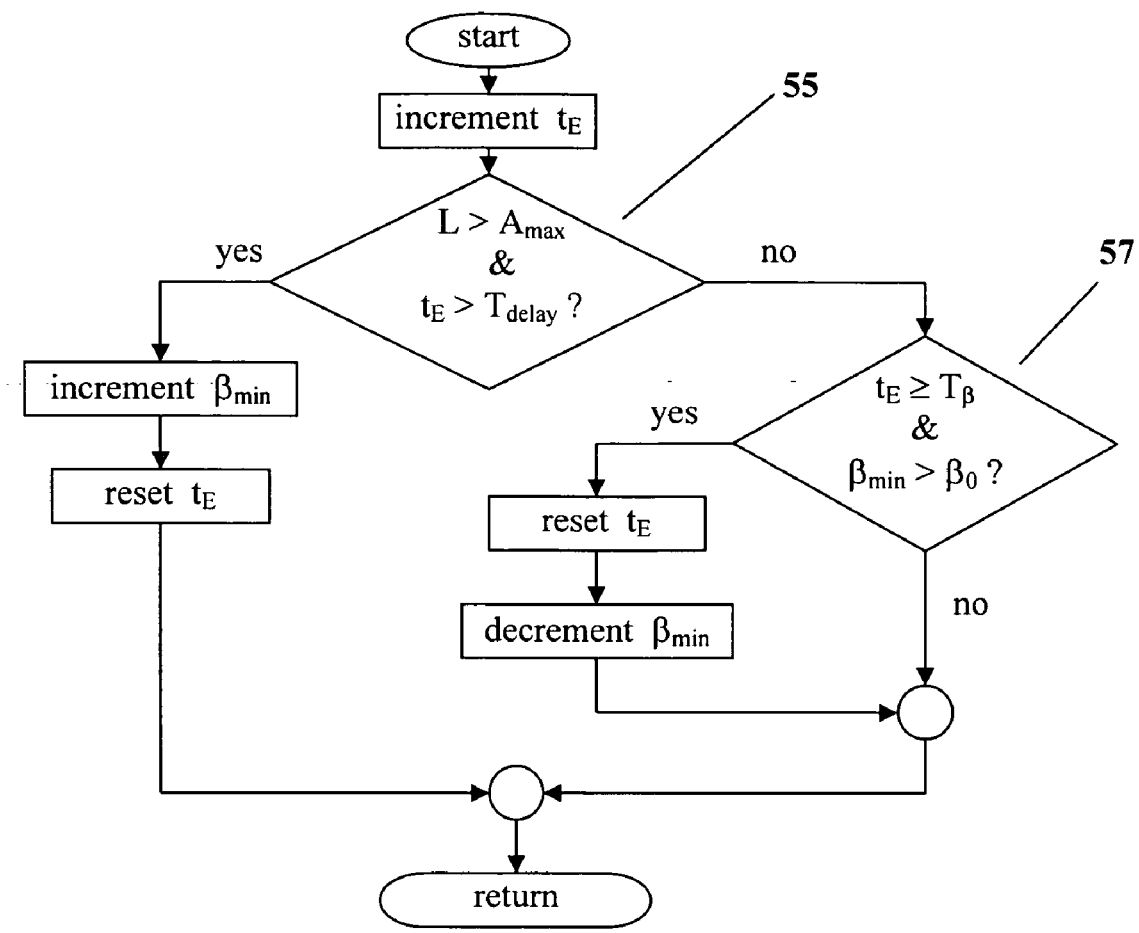
FIG. 3 illustrates the preferred algorithmic embodiment of the invention.

2 illustrates the major subsystems of a utility grade wind turbine. In this embodiment, the control hardware 21 is attached to the transmission 23. The transmission 23 is fed by the main shaft 25, which is supported by the main shaft bearing housing 27. The main shaft 25 supports the hub 31, which holds the blades 29. The main shaft bearing housing 27, the transmission 23, and the generator 33 are supported by the main frame 37. The main frame 37 rests on the yaw bearing 39, which rests on the tower 41. The tower 41 is supported by the foundation 43. Direct load measurements can be made on the blades 29, the hub 31, the main shaft 25, the transmission 23, the main frame 37, or the tower 41. Direct measurements are taken by strain gages which measure the actual deflection of the component material. Strain gages and their use are taught in the textbook "Experimental Stress Analysis", $4^{th}$ Edition by J. Dally and W. Riley published by McGraw Hill in 2001, incorporated herein by reference. Although strain gages are a direct measurement, strain gages typically have a limited life, require precise calibration by applying known loads after being installed, and experience drift that must be compensated. In addition, measurement of any quantity on a rotation component such as the blades 29, hub 31, or main shaft 25 will need to be transmitted to the location of the controller in the non-rotating reference frame, which is inherently difficult and expensive to do reliably. Indirect measurements can be taken by accelerometers on the main shaft bearing housing 27, the transmission 23, the main frame 37, or the tower 41. Accelerometers measure the acceleration of the component which is caused by loads or natural frequencies, both of which are candidates for load limiting. Direct measurements of displacements on the tower 41 can also be used for load liming. The power the wind turbine is producing at the generator 33 is also a form of load measurement and can be used in load limiting, although the power is typically the quantity used to control the blade pitch, so a second order statistic of the power such as the standard deviation must be used. The preferred embodiment of the invention is shown in the algorithm of FIG. 3, which uses the following symbols: $T_{delay}$ is the delay time to allow the most recent increment of the minimum pitch angle parameter to take effect, $T_\beta$ is the relaxation time, $t_E$ is the elapsed time since the most recent step change of the minimum pitch angle parameter, L is the instantaneous measured load or a statistic of the measured load such as the maximum of the load during the algorithm time step, $A_{max}$ is the load threshold, $\beta_{min}$ is the minimum pitch angle parameter, and $\beta_0$ is the absolute minimum pitch angle. The values chosen for the parameters should be based on the particular wind turbine design, site load projections, and other dynamic or economic considerations. Typical values of the parameters given for illustration are: $T_{delay}$=2 sec, $T_\beta$=5 minutes, and $\beta_0$=0 deg. The load threshold, $A_{max}$, if for example L is a strain gage measurement, can be chosen as the strain corresponding to endurance limit of the material or to a stress level that will allow more cycles than the component will experience in 25 years of operation. The load threshold, $A_{max}$ may be a static value, or it may be varied over time depending on the condition of the wind turbine or depending on factors such as the price of power at a particular moment in time. The controller should be set up to prevent the pitch angle command from dipping below the minimum pitch angle parameter. The algorithm should be executed at every control cycle time step, or a multiple of the control time step. The first conditional 55 compares the latest available load measurement statistic to the load threshold and checks the elapsed time. The load measurement statistic can be the instantaneous measurement if the algorithm is executed every time step, it can be the maximum measurement over the period between executions of the algorithm, or it can be any statistic derived from the load measurement. For example, if fatigue is the primary load condition of concern, a rainflow count of measured loads can be used to calculate a fatigue rate and the fatigue rate can be used as a proxy for loads. If the measured load statistic exceeds the load threshold and the elapsed time exceeds the delay time, then the elapsed time is reset and the minimum pitch angle parameter is incremented. If, on the other hand, the load does not exceed the load threshold or the elapsed time does not exceeded the delay time, conditional 57 compares the elapsed time to the relaxation time and compares the minimum pitch angle parameter to the absolute minimum pitch angle. If the elapsed time exceeds the relaxation time and the minimum pitch angle parameter is greater than the absolute minimum pitch angle, then the elapsed time is reset and the minimum pitch angle parameter is decremented. Incrementing of the minimum pitch angle parameter should accumulate or cascade such that even if the minimum pitch angle parameter is already above the absolute minimum pitch and the load threshold is exceeded after the elapsed time exceeds the delay time, then the minimum pitch angle parameter should be incremented to the next higher value. Since increasing the blade pitch angle spills excess power and load, the loads will continue to be reduced until the turbine is operating within load compliance. As loads diminish over time, the minimum pitch angle parameter will incrementally drop down.

Figure 4:
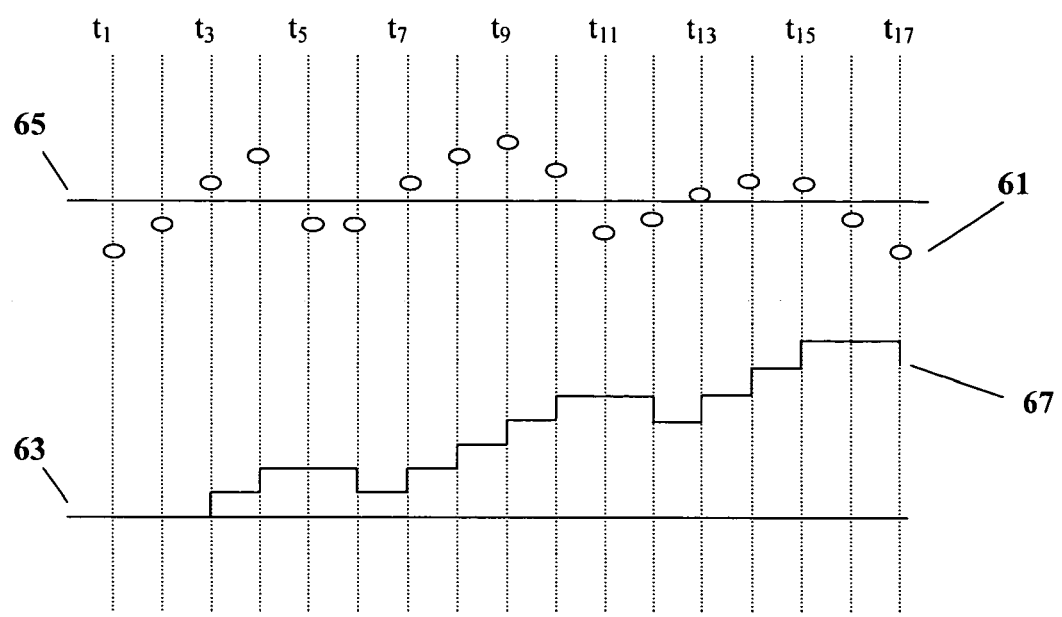
FIG. 4 illustrates the algorithm implemented with a specific time history.

FIG. 4 illustrates how the minimum pitch angle parameter would change with instantaneous load shown in ovals 61 in the specific case, chosen to illustrate the algorithm, in which the relaxation time is twice the algorithm time step and the delay time is zero. In practice, the relaxation time (normally ½ to 10 minutes) will be much larger than the algorithm time step (normally 50 msec to 1 sec), and the delay time (normally 1 to 5 sec) will not be zero. The dashed vertical lines in the figure represent time steps with odd time steps annotated. The absolute minimum pitch angle 63 is the lower horizontal line, and the load threshold 65 is the upper horizontal line. In this case, the minimum pitch angle parameter 67 steps up in time step $t_3$ when the load measurement 61 first exceeds the load threshold 65. The minimum pitch angle parameter 67 then steps back down at time $t_6$ when the load measurement 61 is below the threshold 65 for two steps. The minimum pitch angle parameter 67 steps back up at step $t_7$, and again at steps $t_8$, $t_9$, and $t_{10}$. The minimum pitch angle parameter 67 steps back down at step $t_{12}$, two time steps after the load drops below the load threshold 65. The minimum pitch angle parameter 67 steps up every time step until $t_{16}$ when the load 21 falls below the load threshold 65, but waits two steps to decrement at time step $t_{17}$. In this example, the relaxation time $T_\beta$ is set at two time steps. However, the relaxation time will normally be much longer than two time steps depending on the dynamics and performance of the wind turbine system. In fact, it might be possible that one component, for instance the blades, could have a longer relaxation time than another component, for instance the gearbox.

Figure 5:
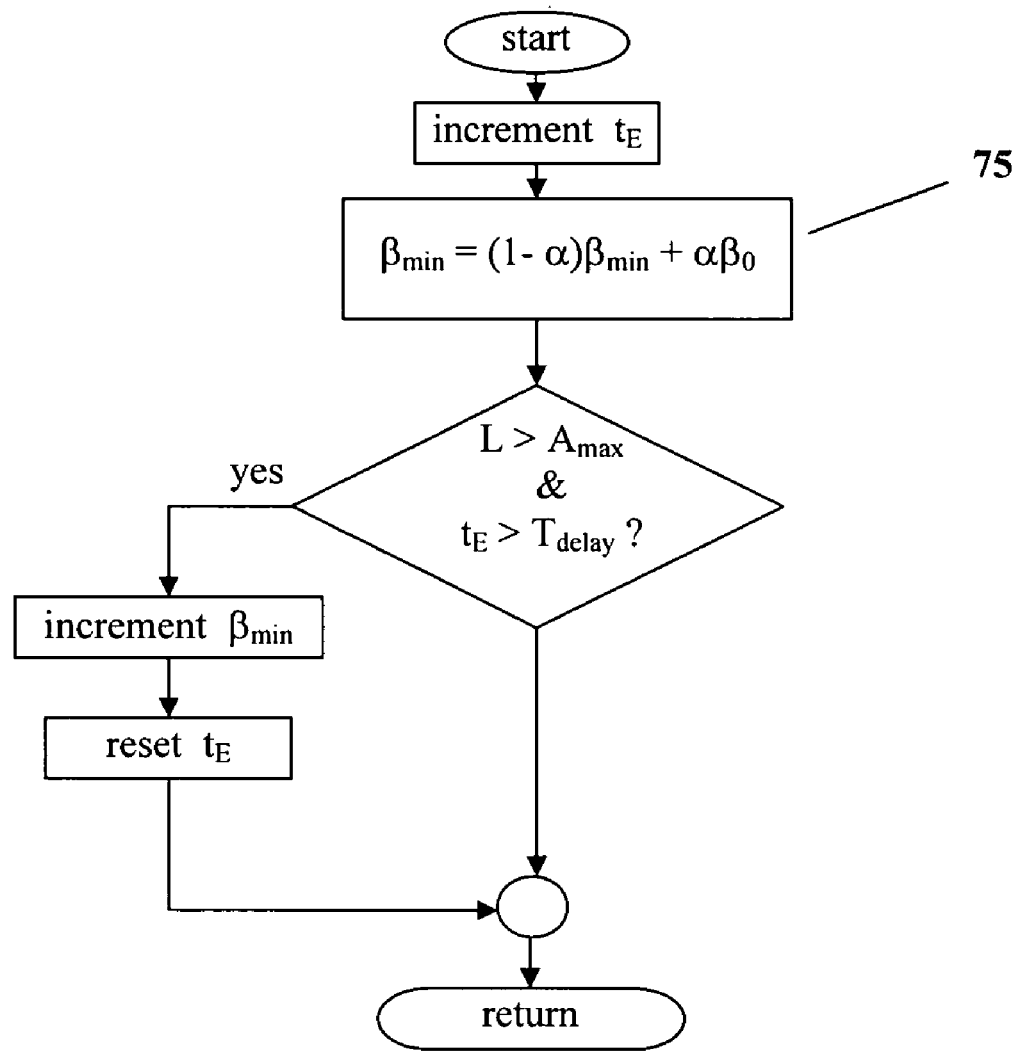
FIG. 5 illustrates a variation of the preferred algorithmic embodiment of the invention that uses a digital filter to relax the minimum pitch angle parameter.

A variation of the preferred embodiment uses a digital filter to relax the minimum pitch angle parameter back to the absolute minimum pitch angle. The simplest digital filter for this application is called the first order lag and is given by the equation, $$\beta_{min}=(1-\alpha)\beta_{min}+\alpha\beta_0,$$

where $\alpha$ is the relaxation constant defined by $\alpha=e^{-t/\Delta t}$, $\tau$ is the relaxation time constant, and $\Delta t$ is the algorithm time step. The flow chart for this variation of the preferred embodiment is shown in FIG. 5. In this variation the minimum pitch angle parameter $\beta_{min}$ is modified by the filter calculation 75 at every time step which is followed by the same conditional of the algorithm of FIG. 3. In practice, the filter calculation can precede the conditional block, follow the conditional block, or can be skipped if the conditional is true. The simplest digital filter has been illustrated, but more complicated digital or analog filters can also be used.

Figure 6:
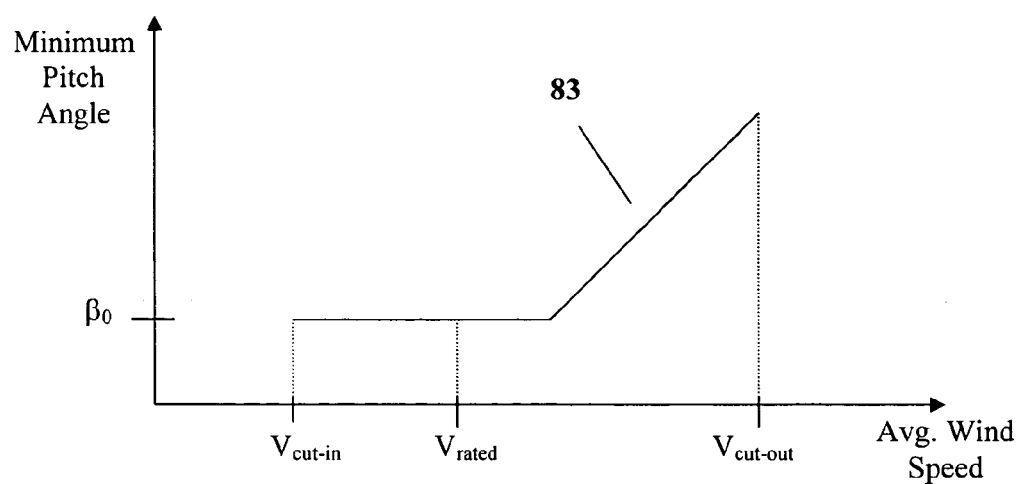
FIG. 6 illustrates how the minimum pitch angle parameter would be a function of average wind speed.

A second embodiment of the invention uses average wind speed from direct wind speed measurements or from wind speed estimated by using the power and the pitch angle to vary the minimum pitch angle parameter at or above the absolute minimum pitch angle to reduce loads. FIG. 6 illustrates how the minimum pitch angle parameter will vary with the average wind speed. In this figure, the horizontal axis is the average wind speed, and the vertical axis is the minimum pitch angle parameter axis, with the absolute minimum pitch angle shown. The minimum pitch angle parameter 83 is defined between the cut-in wind speed, $V_{cut-in}$ the speed at which the winds are strong enough to first generate power, and the high wind cut-out speed, $V_{cut-out}$. The minimum pitch angle parameter 83 should increase to limit loads between the rated wind speed, $V_{rated}$, and $V_{cut-out}$. The minimum pitch angle parameter 83 is shown to increase linearly with average wind speed in FIG. 6, but in practice does not need to increase linearly. FIG. 6 shows the minimum pitch angle parameter 83 staying flat immediately after $V_{rated}$ and starting to increase at a wind speed between $V_{rated}$ and $V_{cut-out}$. At $V_{cut-out}$ the wind turbine will shut down.

A third embodiment of the invention uses a PID method between a statistic of the measured load and the threshold load to vary the minimum pitch angle parameter at or above the absolute minimum pitch angle parameter to reduce loads.

Increasing the minimum pitch angle parameter will not only limit loads, but will remediate the problem of incurring large fluctuations because it will curtail the pitch controller from commanding low pitch angles in high winds.

Figure 7:
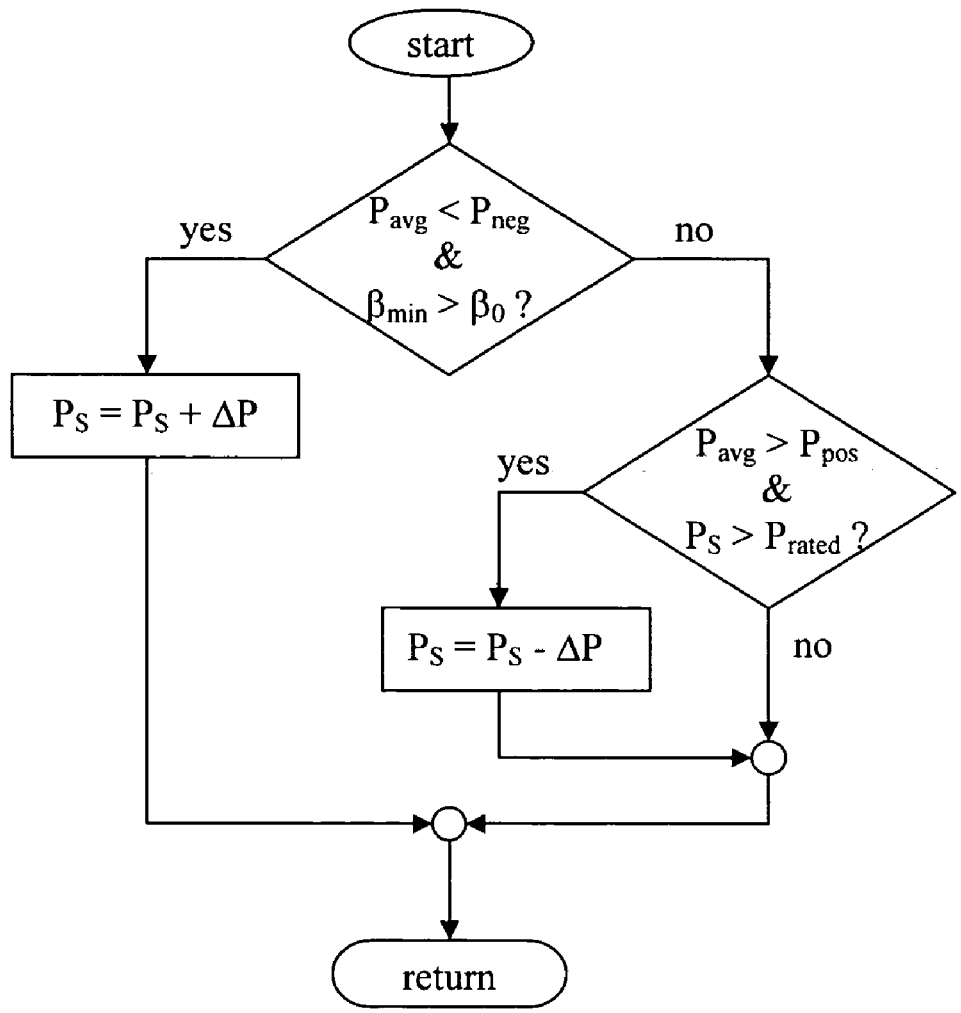
FIG. 7 illustrates the rated power adjustment algorithm.

If increasing the minimum pitch angle parameter tends to reduce the average power to below rated power in above rated wind speeds, a rated power parameter can be introduced and adjusted using an incremental or PID method to compensate for the loss. The incremental method is shown in the algorithm of FIG. 7. In the figure, a negative power threshold $P_{neg}$ is compared to an average power $P_{avg}$ to decide if the average power is too low when the minimum pitch angle parameter $\beta_{min}$ is greater than the absolute minimum pitch angle $\beta_0$ in which case the rated power parameter $P_S$ is increased by a power increment $\Delta P$. On the other hand, if the average power, $P_{avg}$ is greater than the positive threshold $P_{pos}$ and the rated power parameter $P_S$ is greater than the nominal rated power $P_{rated}$ then the rated power parameter $P_S$ is decremented.

The present invention will significantly reduce operating loads in high winds which will extend the turbine life and allow operation in higher winds. In addition, the present invention will reduce loads enough to allow the same turbine mechanical system to be used with larger rotors, thereby significantly increasing the energy capture of the turbine with little additional cost. This will reduce the cost of energy: the ultimate measure of a wind turbine's cost effectiveness.

What is claimed is:

1. A method for limiting loads in a variable pitch wind turbine comprising:
   providing a sensor to measure a load on said wind turbine;
   defining a load threshold;
   defining a minimum pitch angle parameter below which a pitch controller in said variable pitch wind turbine is prevented from operating;
   comparing said measured loads to said load threshold; and
   increasing said minimum pitch angle parameter for an extended period of time when said measured load exceeds said load threshold, thereby limiting loads.

2. The method of claim 1 wherein said step of providing a sensor to measure a load on said wind turbine comprises providing a sensor to measure acceleration of a structural component of said wind turbine.

3. The method of claim 1 wherein said step of providing a sensor to measure a load on said wind turbine comprises providing a sensor to measure velocity of a structural component of said wind turbine.

4. The method of claim 1 wherein said step of providing a sensor to measure a load on said wind turbine comprises providing a sensor to measure displacement of a structural component of said wind turbine.

5. The method of claim 1 wherein said step of providing a sensor to measure a load on said wind turbine comprises providing a sensor to measure bending loads on a blade, main shaft, or tower of said wind turbine.

6. The method of claim 1 wherein said step of providing a sensor to measure a load on said wind turbine comprises measuring the power generated by said wind turbine and calculating a statistic of said power.

7. The method of claim 1 wherein said step of providing a sensor to measure a load on said wind turbine comprises providing a sensor and method for calculating the wind speed and calculating a statistic of said wind speed.

8. The method of claim 1 further comprising the steps of:
   defining a delay time;
   incrementing said minimum pitch angle parameter when said measured load exceeds said load threshold as long as said delay time has elapsed from any previous incrementation of said minimum pitch angle parameter.

9. The method of claim 8 further comprising the steps of:
   defining an absolute lowest minimum pitch angle;
   defining a relaxation time for decrementing said minimum pitch angle parameter but not below said absolute lowest minimum pitch angle parameter when said measured load remains below said load threshold.

10. The method of claim 9 further comprising the steps of:
    defining an elapsed time counter;
    initiating said elapsed time counter when said measured load crosses below said load threshold, wherein said elapsed time counter continues to count as long as said measured load remains below said load threshold, and wherein said minimum pitch angle parameter is decremented when said elapsed time reaches said relaxation time.

11. The method of claim 10 wherein said elapsed time counter is initiated after said minimum pitch angle parameter is decremented to prevent rapid decrease of said minimum pitch angle parameter.

12. The method of claim 8 further comprising a filter using a predetermined time constant that decreases said minimum pitch angle parameter when said measured load is less than said load threshold.

13. The method of claim 12 wherein said filter is a digital first-order lag filter.

14. The method of claim 1 further comprising the steps of:
defining an absolute lowest minimum pitch angle;
defining a relaxation time for decrementing said minimum pitch angle parameter but not below said absolute lowest minimum pitch angle parameter when said measured load remains below said load threshold.

15. The method of claim 14 further comprising the steps of:
defining an elapsed time counter;
initiating said elapsed time counter when said measured load crosses below said load threshold, wherein said elapsed time counter continues to count as long as said measured load remains below said load threshold, and wherein said minimum pitch angle parameter is decremented when said elapsed time equals said relaxation time.

16. The method of claim 15 wherein said elapsed time counter is initiated after said minimum pitch angle parameter is decremented to prevent rapid decrease of said minimum pitch angle parameter.

17. The method of claim 1 further comprising a filter using a predetermined time constant that decreases said minimum pitch angle parameter when said measured load is less than said load threshold.

18. The method of claim 17 wherein said filter is a digital first-order lag filter.

19. The method of claim 1 further comprising the steps of:
measuring power from said wind turbine and forming an average of said measured power;
comparing said average power from said wind turbine to a nominal rated power; and
increasing the rated power of said wind turbine if said average power is less than said nominal power during periods when said minimum pitch angle parameter has been increased.

20. The method of claim 19 wherein said rated power of said wind turbine is decreased to said nominal rated power when said minimum pitch angle parameter is decreased to absolute minimum pitch angle.

21. The method of claim 19 wherein said rated power is decreased toward said nominal rated power when said average power is larger than said nominal rated power.

22. The method of claim 1 wherein the step of increasing said minimum pitch angle parameter comprises the steps of:
inputting said measured load to a proportional, integral, derivative (PID) control system; and
increasing or decreasing said minimum pitch angle parameter based on the output of said PID control system.

23. A wind turbine comprising:
a plurality of blades attached to a main shaft for rotation therewith wherein said blades are capable of being pitched about a longitudinal axis to control power output of said wind turbine;
a pitch control system that adjusts blade pitch with changes in wind speed wherein said pitch control system has a minimum pitch angle parameter that maintains the pitch angle of said blades greater than said minimum pitch angle parameter;
a sensor that measures a load on said wind turbine; and
a load control system that compares the measured load to a pre-determined load threshold and temporarily increases said minimum pitch angle parameter when said measured load exceeds said load threshold.

24. The wind turbine of claim 23 wherein said load control system comprises an elapsed time counter that is initiated when said minimum pitch angle parameter is increased and wherein further increases in said minimum pitch angle parameter are prevented until said elapsed time counter exceeds a predetermined time delay.

25. The wind turbine of claim 23 wherein said load control system comprises an elapsed time counter that begins counting when said measured load becomes less than said load threshold and continues to count as long as said measured load remains less than said load threshold and wherein said minimum pitch angle is decreased when said elapsed time counter exceeds a predetermined relaxation time.

26. The wind turbine of claim 23 wherein said load control system comprises a filter with a predetermined time constant to reduce said minimum pitch angle parameter when said measured load is less than said load threshold.

* * * * *